(12) United States Patent
Min (10) Patent No.: US 10,764,531 B1
(45) Date of Patent: Sep. 1, 2020

(54) MOBILE GEOTAGGING DEVICES AND SYSTEMS AND METHODS OF MOBILE GEOTAGGING SYSTEMS

(71) Applicant: Hao Min, Nanjing (CN)

(72) Inventor: Hao Min, Nanjing (CN)

(73) Assignee: NANJING EASTHOUSE ELECTRICAL CO., LTD, Nanjing (CN)

( * ) Notice: Subject to any disclaimer, the term of this patent is extended or adjusted under 35 U.S.C. 154(b) by 0 days.

(21) Appl. No.: 15/771,811

(22) PCT Filed: Apr. 11, 2018

(86) PCT No.: PCT/CN2018/082682
§ 371 (c)(1),
(2) Date: Apr. 27, 2018

(87) PCT Pub. No.: WO2019/196032
PCT Pub. Date: Oct. 17, 2019

(51) Int. Cl.
| | | |
|---|---|---|
| *H04N 5/92* | (2006.01) | |
| *H04W 4/02* | (2018.01) | |
| *H04M 1/725* | (2006.01) | |
| *H04N 5/765* | (2006.01) | |
| *G11B 27/11* | (2006.01) | |
| *G01S 19/13* | (2010.01) | |

(Continued)

(52) U.S. Cl.
CPC ........... *H04N 5/9201* (2013.01); *G01S 19/13* (2013.01); *G11B 27/11* (2013.01); *H04M 1/72527* (2013.01); *H04N 5/04* (2013.01); *H04N 5/765* (2013.01); *H04W 4/02* (2013.01); *H04W 88/02* (2013.01)

(58) Field of Classification Search
CPC ........ H04N 5/9201; H04N 5/04; H04N 5/765; G01S 19/13; G11B 27/11; H04M 1/72527; H04W 4/02
See application file for complete search history.

(56) References Cited

U.S. PATENT DOCUMENTS

| | | | | |
|---|---|---|---|---|
| 8,700,236 B1 * | 4/2014 | Berman | ................. | G07C 5/008 |
| | | | | 701/16 |
| 9,875,257 B2 * | 1/2018 | Sol | ...................... | G06F 16/5866 |

(Continued)

*Primary Examiner* — Mishawn N. Hunter
(74) *Attorney, Agent, or Firm* — Ming Jiang; MM IP Services LLC (57) ABSTRACT

Aspects of present disclosure relates to a mobile geotagging device, a mobile geotagging system, and methods of mobile geotagging system. In certain embodiments, mobile geotagging device includes: a display screen, a processor, and a non-volatile storage device storing a mobile geotagging application. When executed by processor, mobile geotagging application causes the processor to: generate a time-coded image containing an initial starting point of time, track timing and geolocation information of mobile geotagging device while a digital camera is in use, and store tracked timing and geolocation data, receive a set of images and videos from digital camera, append timing and geolocation information in EXIF into corresponding image files and video files based on a timing difference between digital camera and mobile geotagging device and tracked timing and geolocation information data stored in geolocation/timing tracking storage, and store the images and videos having updated timing and geolocation information in image/video storage.

26 Claims, 3 Drawing Sheets

(51) Int. Cl.
*H04N 5/04* (2006.01)
*H04W 88/02* (2009.01)

(56) References Cited

U.S. PATENT DOCUMENTS

| | | | |
|---|---|---|---|
| 2009/0222482 A1* | 9/2009 | Klassen | G06F 16/58 |
| 2011/0191206 A1* | 8/2011 | Kiarostami | G06Q 30/0633 |
| | | | 705/26.8 |
| 2013/0013414 A1* | 1/2013 | Haff | G06Q 30/0241 |
| | | | 705/14.64 |
| 2014/0108340 A1* | 4/2014 | Osher | H04N 21/4524 |
| | | | 707/623 |
| 2014/0279096 A1* | 9/2014 | Akin | G06Q 20/20 |
| | | | 705/16 |
| 2015/0242689 A1* | 8/2015 | Mau | G06F 16/583 |
| | | | 382/190 |
| 2015/0269201 A1* | 9/2015 | Caso | H04L 29/0854 |
| | | | 707/641 |
| 2017/0116669 A1* | 4/2017 | Wickstrom | G06Q 10/1097 |

\* cited by examiner

MOBILE GEOTAGGING DEVICES AND SYSTEMS AND METHODS OF MOBILE GEOTAGGING SYSTEMS

FIELD

The present disclosure generally relates to digital photography, and more particularly to a mobile geotagging device, a mobile geotagging system and methods of the mobile geotagging system to append timing and geolocation information onto digital files of images and videos taken by a digital camera.

BACKGROUND

A digital camera is a camera that captures photographs in digital form and stores in non-volatile memory. Most cameras produced today are digital, and while there are still dedicated compact cameras on the market, as digital cameras are now incorporated into many devices ranging from mobile devices to vehicles. An image or a video file may embed metadata of the image or the video in an Exchangeable Image File Format (EXIF). The metadata may include, among other things, date and time of the image or the video is taken, size and resolution of the image or the video, make and model of the camera, speed and aperture of the shutter, lens information, location where the image or the video was taken, and even name of the owner/photographer.

Conventional digital cameras are capable of capturing most of information listed above. However, most conventional digital cameras do not have a GPS module to determine the location where the image or the video is taken, so the location information will not able a part of the metadata of the image or the video. As the digital images and videos become more popular, Location information becomes increasingly important part of the digital images and digital videos. Although certain hardware becomes available as an add-on to conventional digital cameras such that digital cameras can include location information, it is desirable to have a minimum-cost, low-cost, or no-cost software solution to integrate location information into ever-growing number of digital images and digital videos.

Therefore, a heretofore unaddressed needs still exist in the art to address the aforementioned deficiencies and inadequacies.

SUMMARY

In one aspect, the present disclosure relates to a mobile geotagging device. In certain embodiments, the mobile geotagging device includes: a display module connected to a display screen, a processor, and a non-volatile storage device. The non-volatile storage device stores a mobile geotagging application and the mobile geotagging application includes: a geolocation/timing tracking storage, a mobile geotagging control module, a network communication module, and the image/video storage. The display screen displays a time-coded image showing current time and images and videos stored in an image/video storage of the mobile geotagging application. When executed by the processor, the mobile geotagging application causes the processor to perform: generating, by the display module on the display screen, a time-coded image containing an initial starting point of time to allow a digital camera having internal timing to acquire the initial starting point of time of the mobile geotagging device and to sync the timing between the digital camera and the mobile geotagging device, tracking, by the mobile geotagging control module through a geolocation module and a timing module, timing and geolocation information of the mobile geotagging device while the digital camera is in use, and storing, by the geolocation/timing tracking storage, the tracked timing and geolocation data.

In certain embodiments, the mobile geotagging application also causes the processor to perform: receiving, by the mobile geotagging device through an image/video transfer channel, a set of images and videos taken by a user from the digital camera; appending, by the mobile geotagging control module, timing and geolocation information in an EXIF into image file and video file based on a timing difference between the digital camera and the mobile geotagging device and the tracked timing and geolocation information retrieved from the geolocation/timing tracking storage; and storing, by the image/video storage, the set of images and videos having timing and geolocation information in the image/video storage.

In certain embodiments, the mobile geotagging control module performs one or more of following functions: receiving the time-coded image from the digital camera and retrieving the initial starting point of time of the mobile geotagging device; determining the timing difference between the digital camera and the mobile geotagging device; receiving the set of images and videos from the digital camera through the image/video transfer channel, each of the set of images and videos having the timing of the digital camera.

In certain embodiments, the mobile geotagging control module also performs one or more of following functions: converting the timing of the digital camera to the timing of the mobile geotagging device; retrieving the geolocation information for each of the set of images and videos from the geolocation/timing tracking storage based on the timing of the mobile geotagging device; appending the converted timing and geolocation information in EXIF of each of the set of images and videos based on the timing difference between the digital camera and the mobile geotagging device and the tracked timing and geolocation information retrieved from the geolocation/timing tracking storage; and storing each of the set of images and videos having timing and geolocation information into the image/video storage.

In certain embodiments, the mobile geotagging control module appends converted mobile geotagging device time into the set of images and videos. The converted mobile geotagging device time may include a local time and a time of a user-designated location.

In certain embodiments, the mobile geotagging device includes a smart phone, a mobile communication device, a portable computer, and a tablet computer. The image/video transfer channel includes: a network, a network interface controller, the network communication module and a USB interface module, wherein the network comprises a wireless personal area network (WPAN) having a Wi-Fi network, a Bluetooth network, an infrared network, and a Zigbee network, a wireless local area network (WLAN), a wireless metropolitan area network (WMAN), a wireless wide area network (WWAN), a cellular network, and a mobile communication network.

In certain embodiments, the mobile geotagging device and the digital camera are kept in close proximity to ensure geotagging accuracy. The geolocation module includes a module capable of receiving and processing geolocation information including a Global Positioning System (GPS), a Global Navigation Satellite System (GLONASS), a Galileo global navigation satellite system, a BeiDou Navigation Satellite System, and a location based service (LBS) system.

In certain embodiments, the mobile geotagging application is an Apple iOS application program, an Android application program, a Linux application program, and a Microsoft Windows Phone application program.

In another aspect, the present disclosure relates to a mobile geotagging system, In certain embodiments, the mobile geotagging system includes: a digital camera, and a mobile geotagging device. The digital camera and the mobile geotagging device are connected through an image/video transfer channel.

In certain embodiments, the mobile geotagging device includes: a display module connected to a display screen, a processor, and a non-volatile storage device. The non-volatile storage device stores a mobile geotagging application and the mobile geotagging application includes: a geolocation/timing tracking storage, a mobile geotagging control module, a network communication module, and the image/video storage. The display screen displays a time-coded image showing current time and images and videos stored in an image/video storage of the mobile geotagging application. When executed by the processor, the mobile geotagging application causes the processor to perform: generating, by the display module on the display screen, a time-coded image containing an initial starting point of time to allow a digital camera having internal timing to acquire the initial starting point of time of the mobile geotagging device and to sync the timing between the digital camera and the mobile geotagging device, tracking, by the mobile geotagging control module through a geolocation module and a timing module, timing and geolocation information of the mobile geotagging device while the digital camera is in use, and storing, by the geolocation/timing tracking storage, the tracked timing and geolocation data. In certain embodiments, the mobile geotagging application also causes the processor to perform: receiving, by the mobile geotagging device through the image/video transfer channel, a set of images and videos taken by a user from the digital camera; appending, by the mobile geotagging control module, timing and geolocation information in an EXIF into image file and video file based on the timing difference between the digital camera and the mobile geotagging device and the tracked timing and geolocation information retrieved from the geolocation/timing tracking storage; and storing, by the image/video storage, the set of images and videos having timing and geolocation information in the image/video storage.

In certain embodiments, the mobile geotagging control module appends converted mobile geotagging device time into the set of images and videos. The converted mobile geotagging device time may include a local time and a time of a user-designated location.

In certain embodiments, the mobile geotagging control module performs one or more of following functions: receiving the time-coded image from the digital camera and retrieving the initial starting point of time of the mobile geotagging device; determining the timing difference between the digital camera and the mobile geotagging device; receiving the set of images and videos from the digital camera through the image/video transfer channel, each of the set of images and videos having the timing of the digital camera.

In certain embodiments, the mobile geotagging control module also performs one or more of following functions: converting the timing of the digital camera to the timing of the mobile geotagging device; retrieving the geolocation information for each of the set of images and videos from the geolocation/timing tracking storage based on the timing of the mobile geotagging device; appending the converted timing and geolocation information in EXIF of each of the set of images and videos based on the timing difference between the digital camera and the mobile geotagging device and the tracked timing and geolocation information retrieved from the geolocation/timing tracking storage; and storing each of the set of images and videos having timing and geolocation information into the image/video storage.

In yet another aspect, the present disclosure relates to a method of mobile geotagging system. In certain embodiments, the method includes: installing a mobile geotagging application onto a mobile geotagging device; generating, by a display module on a display screen of the mobile geotagging device, a time-coded image containing initial starting point of time to allow a digital camera having internal timing to acquire an initial starting point of time of the mobile geotagging device and to sync the timing between the digital camera and the mobile geotagging device.

In certain embodiments, the method also includes: tracking, by a mobile geotagging control module of the mobile geotagging application through a geolocation module and a timing module of the mobile geotagging device, timing and geolocation information of the mobile geotagging device while the digital camera is in use, storing, by a geolocation/timing tracking storage of the mobile geotagging application, the tracked timing and geolocation information.

In certain embodiments, the method also includes: receiving, by the mobile geotagging device through an image/video transfer channel, a set of images and videos taken by a user from the digital camera, appending, by the mobile geotagging control module, timing and geolocation information in an EXIF into image file and video file based on a timing difference between the digital camera and the mobile geotagging device and the tracked timing and geolocation information retrieved from the geolocation/timing tracking storage, and storing, by an image/video storage of the mobile geotagging application, the set of images and videos having timing and geolocation information in the image/video storage.

In certain embodiments, the mobile geotagging control module performs one or more of following functions: receiving the time-coded image from the digital camera and retrieving the initial starting point of time of the mobile geotagging device; determining the timing difference between the digital camera and the mobile geotagging device; receiving the set of images and videos from the digital camera through the image/video transfer channel, each of the set of images and videos having the timing of the digital camera.

In certain embodiments, the mobile geotagging control module also performs one or more of following functions: converting the timing of the digital camera to the timing of the mobile geotagging device; retrieving the geolocation information for each of the set of images and videos from the geolocation/timing tracking storage based on the timing of the mobile geotagging device; appending the converted timing and geolocation information in EXIF of each of the set of images and videos based on the timing difference between the digital camera and the mobile geotagging device and the tracked timing and geolocation information retrieved from the geolocation/timing tracking storage; and storing each of the se of images and videos having timing and geolocation information into the image/video storage.

In certain embodiments, the mobile geotagging control module appends converted mobile geotagging device time into the set of images and videos. The converted mobile geotagging device time may include a local time and a time of a user-designated location.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein:

FIG. 1 illustrates a mobile geotagging system according to certain embodiments of present disclosure.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1 through 3, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
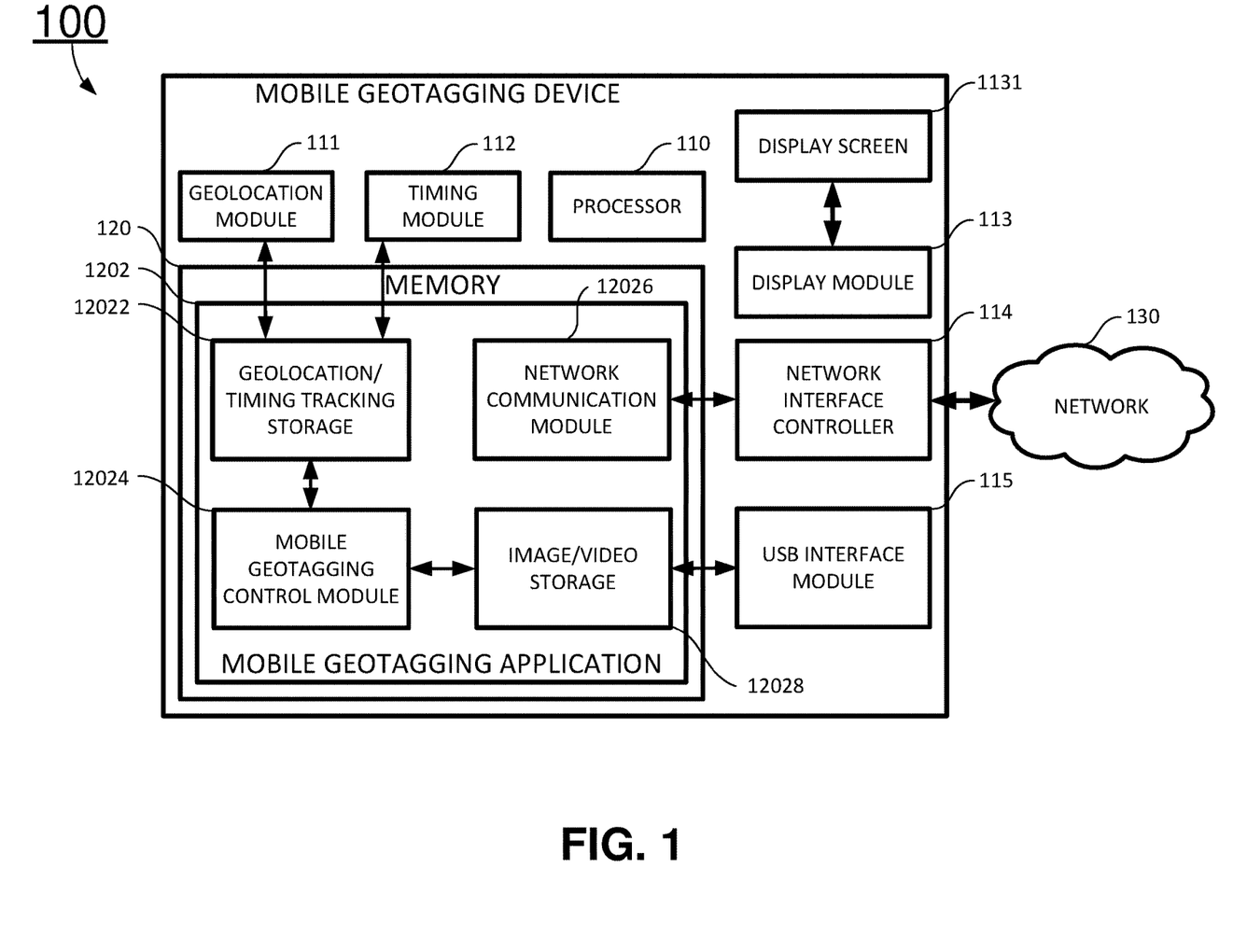
FIG. 1 shows a block diagram of a mobile geotagging device for appending geolocation to images and videos taken by a conventional digital camera according to certain embodiments of the present disclosure.

In one aspect, the present disclosure relates to a mobile geotagging device 100, as shown in FIG. 1. In certain embodiments, the mobile geotagging device 100 includes: a processor 110, a geolocation module 111, a timing module 112, a display module 113, a network interface controller 114, a Universal Serial Bus (USB) interface module 115, and a non-volatile storage device 120. The non-volatile storage device 120, or memory stores a mobile geotagging application 1202. When executed by the processor 110, the mobile geotagging application 1202 causes the processor 110 to generate, tracking timing and geolocation information, and retaining timing and geolocation information of the mobile geotagging device while a nearby digital camera 200 is in use by a user. Once the user finishes taking images or videos, the mobile geotagging application 1202 causes the processor 110 to receive a time-coded image containing an initial starting point of time of the mobile geotagging application 1202, and certain number of images or videos, retrieve tracked timing and geolocation information, process retrieved timing and geolocation information, append and update timing and geolocation information of each of the images or videos, and store these processed images or videos in an image/video storage device.

In certain embodiments, the time-coded image may include: a series numbers, two-dimensional code, bar code, QR code, and/or and code where the embedded time can be read and processed by a computer image recognition software. The time-coded image is updated in real-time such that when the time-coded image is captured by the digital camera 200, this image always reflects the accurate time.

In certain embodiments, the mobile geotagging application 1202 includes: a geolocation/timing tracking storage 12022, a mobile geotagging control module 12024, a network communication module 12026, and the image/video storage 12028.

In certain embodiments, the geolocation module 111 includes a hardware module capable of receiving and processing geolocation information. In certain embodiments, the geolocation module 111 can receive and process geolocation information from a Global Positioning System (GPS) created by the United States, a Global Navigation Satellite System (GLONASS) created by the Russian Federation, a Galileo global navigation satellite system created by the European Union, a BeiDou Navigation Satellite System created by China, and many other location based service (LBS) system.

In certain embodiments, the timing module 112 is used to track system timing of the mobile geotagging device 100, and the system timing of the mobile geotagging device 100 is combined with the geolocation information to form a trace of movement of the mobile geotagging device 100 and the digital camera 200 in use. This trace of movement of the mobile geotagging device 100 and the digital camera 200 is stored in the geolocation/timing tracking storage 12022, and will be retrieved and processed by the mobile geotagging control module 12024 to append the geolocation to each of the images or videos taken by the digital camera 200. In order to ensure geotagging accuracy, the mobile geotagging device 100 and the digital camera 200 are kept in close proximity.

In certain embodiments, the trace of movement of the mobile geotagging device 100 and the digital camera 200 may be stored in the geolocation/timing tracking storage 12022 in a simple pair format, a time, and a location with longitude and latitude information. Time sampling rate may be determined by geolocation accuracy requirement. In one embodiment, the geolocation information is recorded every second. In another embodiment, the geolocation information is recorded every minute, every five minutes, or even every ten minutes. In certain embodiments, the data related to the trace of movement of the mobile geotagging device 100 and the digital camera 200 may be very large in the time sampling rate is very high, for example, once every second. In order to reduce the data stored in the geolocation/timing tracking storage 12022, the data may be stored only when the mobile geotagging device 100 and the digital camera 200 are in motion. When the mobile geotagging control module 12024 receives a time and a geolocation information, it compares the time and the geolocation information received in a previous cycle. The mobile geotagging control module 12024 stores the time and the geolocation pair data only when the geolocation information is changed. In this way, the stored data may be greatly reduced, especially for a trip with limited movement.

In certain embodiments, the geolocation module 111 and the timing module 112 may be combined because the geolocation module 111 usually includes current time.

In certain embodiments, the display module 113 is connected to a display screen 1131 to display anything that the mobile geotagging device 100 needs to display. In addition to display images or videos captured and stored in the mobile geotagging device 100, the display module 113 also displays a time-coded image on the display screen 1131 to sync the timing between the mobile geotagging device 100 and the digital camera 200. Usually, the timing of the digital camera 200 may not be the exact system timing of the mobile geotagging device 100, and there is a time difference between the mobile geotagging device 100 and the digital camera 200. In order to capture this timing difference, a time-coded image is generated by the mobile geotagging device 100 and displayed on the display screen 1131. The time-coded image embeds the current time of the mobile geotagging device 100 as an initial starting point of time of the mobile geotagging device 100. The time coded in the time-coded image is the current time, and changes as time goes by. It is not a fixed image that only embeds the time when the image is generated. In one embodiment, when time-coded image is generated, a picture of the time-coded image is taken by the digital camera 200 as a first picture to allow the digital camera 200 to acquire the initial starting point of time of the mobile geotagging device 100. After a series of images or videos is taken by the digital camera 200, and transferred the images and the videos taken to the mobile geotagging device 100, the first picture allows the mobile geotagging control module 12024 to derive the time difference between the mobile geotagging device 100 and the digital camera 200. The mobile geotagging control module 12024 retrieves the time of the first picture from its EXIF, processes the time-coded image of the first picture to acquire the time of the mobile geotagging device 100, and calculates the time difference between the mobile geotagging device 100 and the digital camera 200.

In certain embodiments, the mobile geotagging control module 12024 not only can append geolocation information into the EXIF of all corresponding images and videos, but also append the time of the converted mobile location information into all the corresponding images and videos in EXIF. Therefore, the EXIF of all the corresponding images and videos contains not only the corresponding location information, but also the accurate time information. The converted mobile geotagging device time may include a local time and a time of a user-designated location. Prior to the conversion, the user may decide whether he/she wants to use the local time, or the time of user-designated location.

In one embodiment, the user chooses to use local time, and the converted time of the mobile geotagging device is extracted through the corresponding location information. If a user has taken some images or videos in Paris, the mobile geotagging control module 12024 converts the time to Paris time based on its location information and append the converted Paris time into all the corresponding images and videos in EXIF.

In another embodiment, the user chooses to his/her home town time designated by him/her, for example, Beijing China, and the time of the mobile geotagging device is extracted through the corresponding location information and the time difference between Paris and Beijing is determined and converted. If a user has taken some images or videos in Paris, the mobile geotagging control module 12024 converts the Paris time to Beijing time, and append the Beijing time into all the corresponding images and videos in EXIF, even though the images and videos were taken from Paris.

After the images and the videos are taken by the digital camera 200, the images and the videos are transmitted to the mobile geotagging device 100 for processing. In certain embodiments, a network 130, the network interface controller 114, and the network communication module 12026 may be used to transmit these images or videos. The network 130 includes: a wireless personal area network (WPAN), a wireless local area network (WLAN), a wireless metropolitan area network (WMAN), a wireless wide area network (WWAN), a cellular network, and a mobile communication network. The WPAN may also include a Wi-Fi network, a Bluetooth network, an infrared network, and a Zigbee network.

In certain embodiments, the USB interface module 115 of the mobile geotagging device 100 is used to receive the image files or the video files from the digital camera 200. In one embodiment, the image files or the video files are transferred through the USB interface module 115. In another embodiment, the image files or the video files stored in a solid-state device such as a flash card, a secure digital (SD) card, mini SD card, a micro SD card, a memory stick, or other solid-state storage devices can be transferred from a corresponding card reader over the USB interface module 115 to the mobile geotagging device 100.

In certain embodiments, the network 130, the network interface controller 114, the network communication module 12026, and the USB interface module 115 form an image/video transfer channel 150.

In certain embodiments, when executed by the processor 110, the mobile geotagging application 1202 causes the processor to perform:

generating, by the display module 113 on the display screen 1131, a time-coded image containing the initial starting point of time to allow the digital camera 200 having internal timing to acquire the initial starting point of time of the mobile geotagging device 100 and to sync the timing between the digital camera 200 and the mobile geotagging device 100;

tracking, by the mobile geotagging control module 12024 through the geolocation module 111 and the timing module 112, the timing and geolocation information of the mobile geotagging device 100 while the digital camera 200 is in use; and storing, by the geolocation/timing tracking storage 12022, the tracked timing and geolocation information.

In certain embodiments, the mobile geotagging application 1202 also causes the processor to perform:

receiving, by the mobile geotagging device 100 through the image/video transfer channel 150, a set of images and videos taken by a user from the digital camera 200; appending, by the mobile geotagging control module 12024, timing and geolocation information in an EXIF into image file and video file based on a timing difference between the digital camera 200 and the mobile geotagging device 100 and the tracked timing and geolocation information retrieved from the geolocation/timing tracking storage 12022; and storing, by the image/video storage 12028, the set of the images and videos having timing and geolocation information in the image/video storage 12028.

In certain embodiments, the mobile geotagging control module 12024 performs one or more of following functions:

receiving the time-coded image from the digital camera 200 and retrieving the initial starting point of time of the mobile geotagging device 100;

determining the timing difference between the digital camera 200 and the mobile geotagging device 100;

receiving the set of images and videos from the digital camera 200 through the image/video transfer channel 150, each of the set of images and videos having the timing of the digital camera 200.

In certain embodiments, the mobile geotagging control module 12024 also performs one or more of following functions:

converting the timing of the digital camera 200 to the timing of the mobile geotagging device 100;

retrieving the geolocation information for each of the set of images and videos from the geolocation/timing tracking storage 12022 based on the timing of the mobile geotagging device 100;

appending the converted timing and geolocation information in EXIF of each of the set of images and videos based on the timing difference between the digital camera 200 and the mobile geotagging device 100 and the tracked timing and geolocation information retrieved from the geolocation/timing tracking storage; and storing each of the set of images and videos having timing and geolocation information into the image/video storage 12028.

In certain embodiments, the mobile geotagging control module 12024 can not only append the geolocation information to the set of images and videos taken, but also can convert the time when the set of images and videos is taken to a specific time selected by the user, and append the converted time to the EXIF files of the set of images and videos. This way, the EXIF files of the set of images and videos not only include the geolocation information, but also the accurate time of a location designated by the user. The user may choose the local time where the set of images and videos is taken, or a different location or region designated by the user, for example, the user's home town. If the user lives in New York, or Washington D.C., the time information to be append to the EXIF of the set of images and videos may be Eastern Standard Time in the winter and Eastern Daylight Saving Time in the summer.

In one embodiment, the user chooses to use local time, and the converted time of the mobile geotagging device is extracted through the corresponding location information. If the user has taken some images or videos in Paris, the mobile geotagging control module 12024 converts the time to Paris time based on its location information and append the converted Paris time into all the corresponding images and videos in EXIF.

In another embodiment, the user chooses to his/her home town time designated by him/her, for example, Beijing China, and the time of the mobile geotagging device is extracted through the corresponding location information and the time difference between Paris and Beijing is determined and converted. If a user has taken some images or videos in Paris, the mobile geotagging control module 12024 converts the Paris time to Beijing time, and append the Beijing time into all the corresponding images and videos in EXIF, even though the images and videos were taken from Paris.

In certain embodiments, the mobile geotagging device 100 includes a smart phone, a mobile communication device, a portable computer, and a tablet computer. The image/video transfer channel 150 includes: the network 130, the network interface controller 114, the network communication module 12026, and the USB interface module 115. The network 130 includes a wireless personal area network (WPAN), a wireless local area network (WLAN), a wireless metropolitan area network (WMAN), a wireless wide area network (WWAN), a cellular network, and a mobile communication network. The WPAN may also include a Wi-Fi network, a Bluetooth network, an infrared network, and a Zigbee network. The network 130 is used to transmit the images and the videos wirelessly. In certain embodiments, the USB interface module 115 of the mobile geotagging device 100 is used to receive the image files or the video files from the digital camera 200.

In certain embodiments, the mobile geotagging application 1202 is an Apple iOS application program, an Android application program, a Linux application program, and a Microsoft Windows Phone application program.

Figure 2:
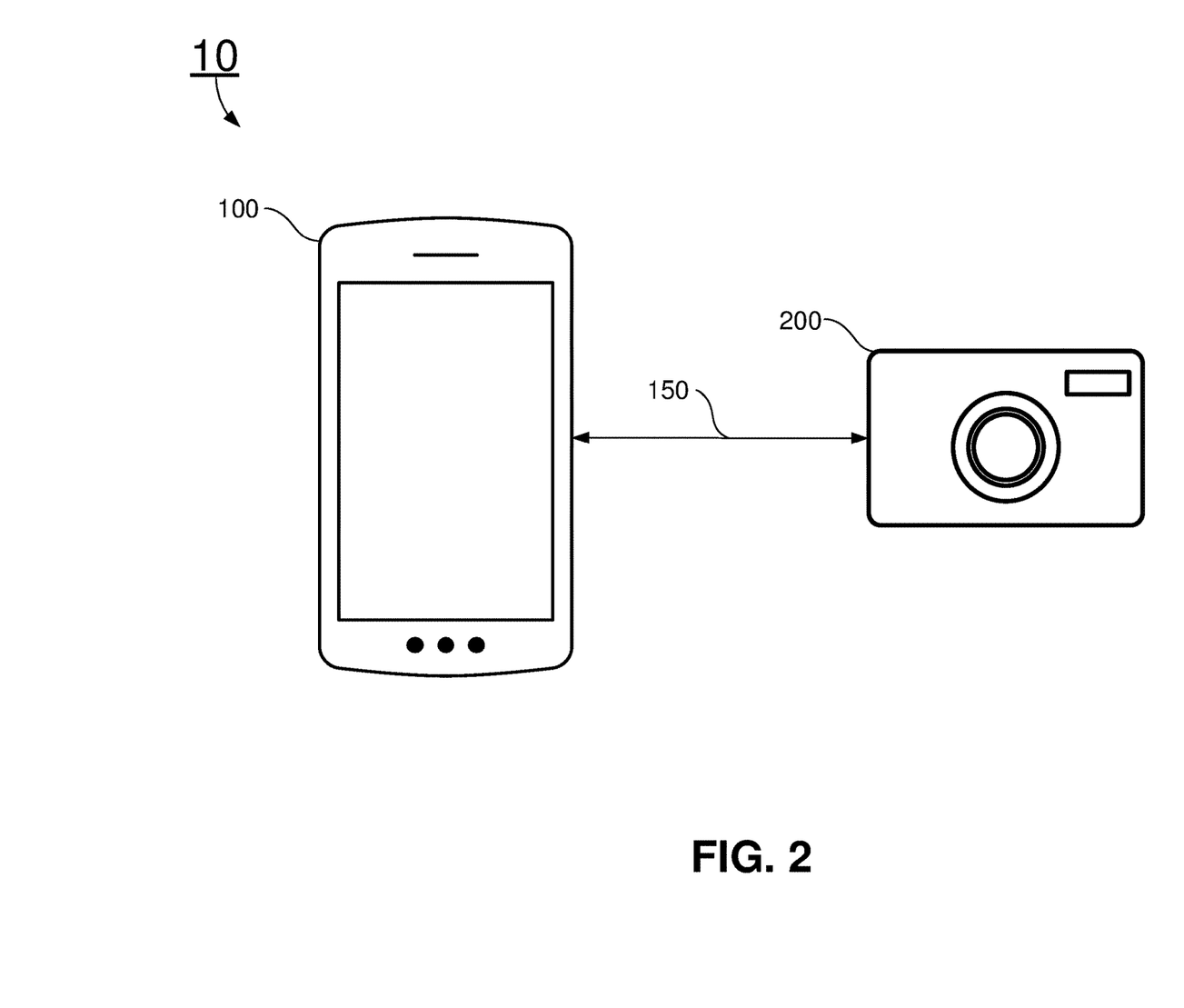

In another aspect, the present disclosure relates to a mobile geotagging system 10 as shown in FIG. 2. In certain embodiments, the mobile geotagging system 10 includes: a digital camera 200, and a mobile geotagging device 100.

In certain embodiments, the mobile geotagging device 100 includes: a processor 110, a geolocation module 111, a timing module 112, a display module 113, a network interface controller 114, a Universal Serial Bus (USB) interface module 115, and a non-volatile storage device 120. The non-volatile storage device 120, or memory stores a mobile geotagging application 1202.

In certain embodiments, the mobile geotagging device 100 includes a smart phone, a mobile communication device, a portable computer, and a tablet computer.

In certain embodiments, the mobile geotagging application 1202 is an Apple iOS application program, an Android application program, a Linux application program, and a Microsoft Windows Phone application program.

The digital camera 200 and the mobile geotagging device 100 are connected through an image/video transfer channel 150.

In certain embodiments, a network 130, the network interface controller 114, and the network communication module 12026 form the image/video transfer channel 150 to transmit these images or videos. The network 130 includes: a wireless personal area network (WPAN), a wireless local area network (WLAN), a wireless metropolitan area network (WMAN), a wireless wide area network (WWAN), a cellular network, and a mobile communication network. The WPAN may also include a Wi-Fi network, a Bluetooth network, an infrared network, and a Zigbee network.

In certain embodiments, the USB interface module 115 of the mobile geotagging device 100 is used to receive the image files or the video files from the digital camera 200. In one embodiment, the image files or the video files are transferred through the USB interface module 115. In another embodiment, the image files or the video files stored in a solid-state device such as a flash card, a secure digital (SD) card, mini SD card, a micro SD card, a memory stick, or other solid-state storage devices can be transferred from a corresponding card reader over the USB interface module 115 to the mobile geotagging device 100.

In certain embodiments, when executed by the processor 110, the mobile geotagging application 1202 causes the processor to perform:

generating, by the display module 113 on the display screen 1131, a time-coded image containing an initial starting point of time to allow a digital camera 200 having internal timing to acquire the initial starting point of time of the mobile geotagging device 100 and to sync the timing between the digital camera 200 and the mobile geotagging device 100;

tracking, by the mobile geotagging control module 12024 through a geolocation module 111 and a timing module 112, timing and geolocation information of the mobile geotagging device 100 while the digital camera 200 is in use, and storing, by the geolocation/timing tracking storage 12022, the tracked timing and geolocation data.

In certain embodiments, the mobile geotagging application 1202 also causes the processor to perform:

receiving, by the mobile geotagging device 100 through the image/video transfer channel 150, a set of images and videos taken by a user from the digital camera 200;

appending, by the mobile geotagging control module 12024, timing and geolocation information in an EXIF into image file and video file based on a timing difference between the digital camera 200 and the mobile geotagging device 100 and the tracked timing and geolocation information retrieved from the geolocation/timing tracking storage 12022; and storing, by the image/video storage 12028, the set of the images and videos having timing and geolocation information in the image/video storage 12028.

In certain embodiments, the mobile geotagging control module 12024 performs one or more of following functions: receiving the time-coded image from the digital camera 200 and retrieving the initial starting point of time of the mobile geotagging device 100; determining the timing difference between the digital camera 200 and the mobile geotagging device 100; receiving the set of images and videos from the digital camera 200 through the image/video transfer channel 150, each of the set of images and videos having the timing of the digital camera 200.

In certain embodiments, the mobile geotagging control module 12024 also performs one or more of following functions: converting the timing of the digital camera 200 to the timing of the mobile geotagging device 100; retrieving the geolocation information for each of the set of images and videos from the geolocation/timing tracking storage 12022 based on the timing of the mobile geotagging device 100; appending the converted timing and geolocation information in EXIF of each of the set of images and videos based on a timing difference between the digital camera 200 and the mobile geotagging device 100 and the tracked timing and geolocation information retrieved from the geolocation/timing tracking storage 12022; and storing each of the set of images and videos having timing and geolocation information into the image/video storage 12028.

Figure 3:
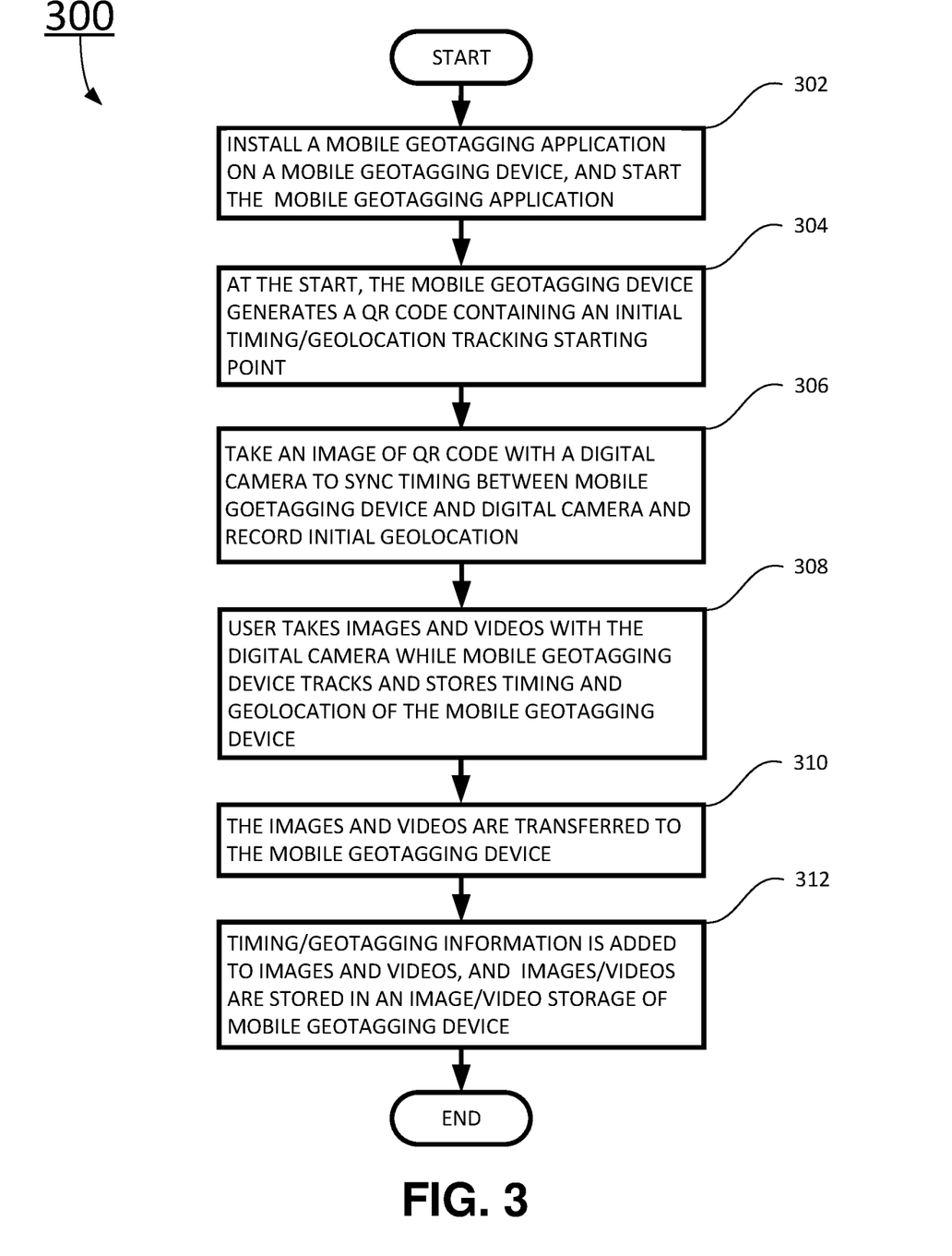
FIG. 3 shows a flow chart of a method a mobile geotagging system according to certain embodiments of the present disclosure.

In yet another aspect, the present disclosure relates to a method 300 of a mobile geotagging system 10 as shown in FIG. 3.

In certain embodiments, the mobile geotagging system 10 includes a mobile geotagging device 100, a digital camera 200, and an image/video transfer channel 150.

At block 302, a user installs the mobile geotagging application 1202 onto a mobile geotagging device 100. In certain embodiments, the mobile geotagging device 100 includes a smart phone, a mobile communication device, a portable computer, and a tablet computer.

In certain embodiments, the mobile geotagging device 100 includes: a processor 110, a geolocation module 111, a timing module 112, a display module 113, a network interface controller 114, a Universal Serial Bus (USB) interface module 115, and a non-volatile storage device 120. The non-volatile storage device 120, or memory stores a mobile geotagging application 1202.

In certain embodiments, the mobile geotagging application 1202 includes: a geolocation/timing tracking storage 12022, a mobile geotagging control module 12024, a network communication module 12026, and the image/video storage 12028.

In certain embodiments, the mobile geotagging application 1202 is an Apple iOS application program, an Android application program, a Linux application program, and a Microsoft Windows Phone application program.

Once the mobile geotagging application 1202 is installed, the user can use the mobile geotagging application 1202 installed on the mobile geotagging device 100 to perform mobile geotagging.

At block 304, the user starts the mobile geotagging application 1202, and the the mobile geotagging application 1202 generates, a time-coded image containing initial starting point of time to allow a digital camera 200 having internal timing to acquire an initial starting point of time of the mobile geotagging device 100 and to sync the timing between the digital camera 200 and the mobile geotagging device 100, and uses the display module 113 to display the time-coded image on a display screen 1131 of the mobile geotagging device 100.

At block 306, user takes a picture of the time-coded image generated by the mobile geotagging application 1202 and displayed on the display screen 1131 of the mobile geotagging device 100 to sync timing between the mobile geotagging device 100 and the digital camera 200. The current time of the mobile geotagging device 100 form the initial starting point of time of the mobile geotagging device 100.

At block 308, while the user takes pictures and videos, the mobile geotagging application 1202 uses the mobile geotagging control module 12024 of the mobile geotagging application 1202 through the geolocation module 111 and the timing module 112 of the mobile geotagging device 100 to track timing and geolocation information. The tracked timing and geolocation information is stored in the geolocation/timing tracking storage 12022 of the mobile geotagging application 1202.

At block 310, the images and video taken by the user are transferred to the mobile geotagging device 100 through the image/video transfer channel 150.

In one embodiment, for a digital camera 200 having wireless capability, a network 130, the network interface controller 114, and the network communication module 12026 form the image/video transfer channel 150 to transmit these images or videos wirelessly. The network 130 includes: a wireless personal area network (WPAN), a wireless local area network (WLAN), a wireless metropolitan area network (WMAN), a wireless wide area network (WWAN), a cellular network, and a mobile communication network. The WPAN may also include a Wi-Fi network, a Bluetooth network, an infrared network, and a Zigbee network. For the mobile geotagging device 100 having the wireless transfer capability, these images and videos are transmitted to the mobile geotagging device 100 wirelessly and continuously while the user is taking the images and videos.

In another embodiment, for the digital camera 200 without wireless capability, the USB interface module 115 of the mobile geotagging device 100 is used to receive the image files or the video files from the digital camera 200 after the images and the videos are taken. In one embodiment, the image files or the video files are transferred through the USB interface module 115 using a USB cable. In another embodiment, the image files or the video files stored in a solid-state device such as a flash card, a secure digital (SD) card, mini SD card, a micro SD card, a memory stick, or other solid-state storage devices can be transferred from a corresponding card reader over the USB interface module 115 to the mobile geotagging device 100.

At block 312, after the images and the videos are transferred, the mobile geotagging control module 12024 of the mobile geotagging application 1202 appends the geolocation information in an EXIF into image files and video files based on a timing difference between the digital camera 200 and the mobile geotagging device 100 and the tracked timing and geolocation information stored in the geolocation/timing tracking storage 12022. The images and videos having the timing and geolocation information appended are stored in the image/video storage 12028 of the mobile geotagging application 1202.

In certain embodiments, the mobile geotagging control module 12024 not only can append the geolocation information to the set of images and videos taken, but also can convert the time when the set of images and videos is taken to a specific time selected by the user, and append the converted time to the EXIF files of the set of images and videos. This way, the EXIF files of the set of images and videos not only include the geolocation information, but also the accurate time of a location designated by the user. The user may choose the local time where the set of images and videos is taken, or a different location or region designated by the user, for example, the user's home town. If the user lives in New York, or Washington D.C., the time information to be append to the EXIF of the set of images and videos may be Eastern Standard Time in the winter and Eastern Daylight Saving Time in the summer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A mobile geotagging device comprising:
  a display module connected to a display screen for displaying a time-coded image showing current time, and displaying images and videos stored in an image/video storage;

a processor, and a non-volatile storage device storing a mobile geotagging application, wherein the mobile geotagging application comprises: a geolocation/timing tracking storage, a mobile geotagging control module, a network communication module, and the image/video storage, when executed by the processor, the mobile geotagging application causes the processor to perform:

generating, by the display module on the display screen, a time-coded image containing an initial starting point of time to allow a digital camera having internal timing to acquire the initial starting point of time of the mobile geotagging device and to sync the timing between the digital camera and the mobile geotagging device;

tracking, by the mobile geotagging control module through a geolocation module and a timing module, timing and geolocation information of the mobile geotagging device while the digital camera is in use;

storing, by the geolocation/timing tracking storage, the tracked timing and geolocation data;

receiving, by the mobile geotagging device through an image/video transfer channel, a plurality of images and videos taken by a user from the digital camera;

appending, by the mobile geotagging control module, timing and geolocation information in an Exchangeable Image File Format (EXIF) into image file and video file based on a timing difference between the digital camera and the mobile geotagging device and the tracked timing and geolocation information retrieved from the geolocation/timing tracking storage; and storing, by the image/video storage, the plurality of the images and videos having timing and geolocation information in the image/video storage.

2. The mobile geotagging device according to claim 1, wherein the mobile geotagging control module performs one or more of following functions:

receiving the time-coded image from the digital camera and retrieving the initial starting point of time of the mobile geotagging device;

determining the timing difference between the digital camera and the mobile geotagging device;

receiving the plurality of images and videos from the digital camera through the image/video transfer channel, each of the plurality of images and videos having the timing of the digital camera;

converting the timing of the digital camera to the timing of the mobile geotagging device;

retrieving the geolocation information for each of the plurality of images and videos from the geolocation/timing tracking storage based on the timing of the mobile geotagging device;

appending the converted timing and geolocation information in EXIF of each of the plurality of images and videos based on the timing difference between the digital camera and the mobile geotagging device and the tracked timing and geolocation information retrieved from the geolocation/timing tracking storage; and storing each of the plurality of images and videos having timing and geolocation information into the image/video storage.

3. The mobile geotagging device according to claim 2, wherein the mobile geotagging control module appends converted mobile geotagging device time into the plurality of images and videos.

4. The mobile geotagging device according to claim 3, wherein the converted mobile geotagging device time comprises a local time and a time of a user-designated location.

5. The mobile geotagging device according to claim 1, wherein the image/video transfer channel comprises: a network, a network interface controller, the network communication module and a USB interface module, wherein the network comprises a wireless personal area network (WPAN) having a Wi-Fi network, a Bluetooth network, an infrared network, and a Zigbee network, a wireless local area network (WLAN), a wireless metropolitan area network (WMAN), a wireless wide area network (WWAN), a cellular network, and a mobile communication network.

6. The mobile geotagging device according to claim 1, wherein the mobile geotagging device comprises a smart phone, a mobile communication device, a portable computer, and a tablet computer.

7. The mobile geotagging device according to claim 1, wherein the mobile geotagging device and the digital camera are kept in close proximity to ensure geotagging accuracy.

8. The mobile geotagging device according to claim 1, wherein geolocation module comprises a module capable of receiving and processing geolocation information including a Global Positioning System (GPS), a Global Navigation Satellite System (GLONASS), a Galileo global navigation satellite system, a BeiDou Navigation Satellite System, and a location based service (LBS) system.

9. The mobile geotagging device according to claim 1, wherein the mobile geotagging application comprises an Apple iOS application program, an Android application program, a Linux application program, and a Microsoft Windows Phone application program.

10. The mobile geotagging system according to claim 8, wherein the mobile geotagging control module performs one or more of following functions:

receiving the time-coded image from the digital camera and retrieving the initial starting point of time of the mobile geotagging device;

determining the timing difference between the digital camera and the mobile geotagging device;

receiving the plurality of images and videos from the digital camera through the image/video transfer channel, each of the plurality of images and videos having the timing of the digital camera;

converting the timing of the digital camera to the timing of the mobile geotagging device;

retrieving the geolocation information for each of the plurality of images and videos from the geolocation/timing tracking storage based on the timing of the mobile geotagging device;

appending the converted timing and geolocation information in EXIF of each of the plurality of images and videos based on the timing difference between the digital camera and the mobile geotagging device and the tracked timing and geolocation information retrieved from the geolocation/timing tracking storage; and storing each of the plurality of images and videos having timing and geolocation information into the image/video storage.

11. The mobile geotagging device according to claim 10, wherein the mobile geotagging control module appends converted mobile geotagging device time into the plurality of images and videos.

12. The mobile geotagging device according to claim 11, wherein the converted mobile geotagging device time comprises a local time and a time of a user-designated location.

13. A mobile geotagging system comprising:
a digital camera;
a mobile geotagging device, connected through an image/video transfer channel, wherein the mobile geotagging device comprises an image/a display module connected to a display screen for displaying a time-coded image showing current time of the mobile geotagging device, and displaying images and videos stored in an image/video storage; a processor, and a non-volatile storage device storing a mobile geotagging application, wherein the mobile geotagging application comprises: a geolocation/timing tracking storage, a mobile geotagging control module, a network communication module, and the image/video storage, when executed by the processor, the mobile geotagging application causes the processor to perform:
generating, by the display module on the display screen, a time-coded image containing an initial starting point of time to allow the digital camera having internal timing to acquire the initial starting point of time of the mobile geotagging device and to sync the timing between the digital camera and the mobile geotagging device;
tracking, by the mobile geotagging control module through a geolocation module and a timing module, timing and geolocation information of the mobile geotagging device while the digital camera is in use;
storing, by the geolocation/timing tracking storage, the tracked timing and geolocation data;
receiving, by the mobile geotagging device through the image/video transfer channel, a plurality of images and videos taken by a user from the digital camera;
appending, by the mobile geotagging control module, timing and geolocation information in an EXIF into image file and video file based on a timing difference between the digital camera and the mobile geotagging device and the tracked timing and geolocation information retrieved from the geolocation/timing tracking storage; and
storing, by the image/video storage, the plurality of the images and videos having timing and geolocation information in the image/video storage.

14. The mobile geotagging system according to claim 13, wherein the image/video transfer channel comprises: a network, a network interface controller, the network communication module and a USB interface module, wherein the network comprises a wireless personal area network (WPAN) having a Wi-Fi network, a Bluetooth network, an infrared network, and a Zigbee network, a wireless local area network (WLAN), a wireless metropolitan area network (WMAN), a wireless wide area network (WWAN), a cellular network, and a mobile communication network.

15. The mobile geotagging system according to claim 13, wherein the mobile geotagging device comprises a smart phone, a mobile communication device, a portable computer, and a tablet computer.

16. The method according to claim 15, wherein the mobile geotagging control module performs one or more of following functions:
receiving the time-coded image from the digital camera and retrieving the initial starting point of time of the mobile geotagging device;
determining the timing difference between the digital camera and the mobile geotagging device;
receiving the plurality of images and videos from the digital camera through the image/video transfer channel, each of the plurality of images and videos having the timing of the digital camera;
converting the timing of the digital camera to the timing of the mobile geotagging device;
retrieving geolocation information for each of the plurality of images and videos from the geolocation/timing tracking storage based on the timing of the mobile geotagging device;
appending the converted timing and geolocation information in EXIF of each of the plurality of images and videos based on the timing difference between the digital camera and the mobile geotagging device and the tracked timing and geolocation information retrieved from the geolocation/timing tracking storage; and
storing each of the plurality of images and videos having timing and geolocation information into the image/video storage.

17. The mobile geotagging device according to claim 16, wherein the mobile geotagging control module appends converted mobile geotagging device time into the plurality of images and videos.

18. The mobile geotagging device according to claim 17, wherein the converted mobile geotagging device time comprises a local time and a time of a user-designated location.

19. The mobile geotagging system according to claim 13, wherein the mobile geotagging device and the digital camera are kept in close proximity to ensure geotagging accuracy.

20. The mobile geotagging system according to claim 13, wherein geolocation module comprises a module capable of receiving and processing geolocation information including a Global Positioning System (GPS), a Global Navigation Satellite System (GLONASS), a Galileo global navigation satellite system, a BeiDou Navigation Satellite System, and a location based service (LBS) system.

21. The mobile geotagging system according to claim 13, wherein the mobile geotagging application comprises an Apple iOS application program, an Android application program, a Linux application program, and a Microsoft Windows Phone application program.

22. A method of a mobile geotagging system, comprising:
installing a mobile geotagging application into a mobile geotagging device;
generating, by a display module on a display screen of the mobile geotagging device, a time-coded image containing initial starting point of time of the mobile geotagging device to allow a digital camera having internal timing to acquire an initial starting point of time of the mobile geotagging device and to sync the timing between the digital camera and the mobile geotagging device;
tracking, by a mobile geotagging control module of the mobile geotagging application through a geolocation module and a timing module of the mobile geotagging device, timing and geolocation information of the mobile geotagging device while the digital camera is in use;
storing, by a geolocation/timing tracking storage of the mobile geotagging application, the tracked timing and geolocation information;
receiving, by the mobile geotagging device through an image/video transfer channel, a plurality of images and videos taken by a user from the digital camera;
appending, by the mobile geotagging control module, timing and geolocation information in an EXIF into image file and video file based on a timing difference between the digital camera and the mobile geotagging device and the tracked timing and geolocation information retrieved from the geolocation/timing tracking storage; and storing, by an image/video storage of the mobile geotagging application, the plurality of the images and videos having timing and geolocation information in the image/video storage.

23. The method according to claim 22, wherein the image/video transfer channel comprises: a network, a network interface controller, the network communication module and a USB interface module, wherein the network comprises a wireless personal area network (WPAN) having a Wi-Fi network, a Bluetooth network, an infrared network, and a Zigbee network, a wireless local area network (WLAN), a wireless metropolitan area network (WMAN), a wireless wide area network (WWAN), a cellular network, and a mobile communication network.

24. The method according to claim 22, wherein the mobile geotagging device comprises a smart phone, a mobile communication device, a portable computer, and a tablet computer, and wherein the mobile geotagging device and the digital camera are kept in close proximity to ensure geotagging accuracy.

25. The method according to claim 22, wherein geolocation module comprises a module capable of receiving and processing geolocation information including a Global Positioning System (GPS), a Global Navigation Satellite System (GLONASS), a Galileo global navigation satellite system, a BeiDou Navigation Satellite System, and a location based service (LBS) system.

26. The method according to claim 22, wherein the mobile geotagging application comprises an Apple iOS application program, an Android application program, a Linux application program, and a Microsoft Windows Phone application program.

* * * * *